(12) United States Patent
Mishchenko et al.

(10) Patent No.: US 11,922,144 B1
(45) Date of Patent: Mar. 5, 2024

(54) SCHEMA-BASED INTEGRATION OF EXTERNAL APIs WITH NATURAL LANGUAGE APPLICATIONS

(71) Applicant: OpenAI Opco, LLC, San Francisco, CA (US)

(72) Inventors: Andrey Mishchenko, San Francisco, CA (US); David Medina, San Francisco, CA (US); Paul McMillan, San Francisco, CA (US); Athyuttam Eleti, San Francisco, CA (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

(21) Appl. No.: 18/186,712

(22) Filed: Mar. 20, 2023

(51) Int. Cl.
*G06F 8/35* (2018.01)
*G06F 16/332* (2019.01)
*G06F 16/34* (2019.01)

(52) U.S. Cl.
CPC ............ *G06F 8/35* (2013.01); *G06F 16/3329* (2019.01); *G06F 16/345* (2019.01)

(58) Field of Classification Search
CPC ....... G06F 8/35; G06F 16/3329; G06F 16/345
See application file for complete search history.

(56) References Cited

U.S. PATENT DOCUMENTS

| | | | |
|---|---|---|---|
| 9,971,766 B2 | 5/2018 | Pasupalak et al. | |
| 10,679,631 B2 | 6/2020 | Hirzel et al. | |
| 10,839,432 B1 | 11/2020 | Konig et al. | |
| 10,891,438 B2 | 1/2021 | Singh et al. | |
| 10,951,552 B2 | 3/2021 | Jafar Ali et al. | |
| 11,366,573 B2 | 6/2022 | Roisman et al. | |

(Continued)

FOREIGN PATENT DOCUMENTS

| | | |
|---|---|---|
| CN | 108108986 B | 10/2020 |
| CN | 114586048 A | 6/2022 |

(Continued)

OTHER PUBLICATIONS

M. Baez, F. Daniel, F. Casati and B. Benatallah, "Chatbot Integration in Few Patterns," in IEEE Internet Computing, vol. 25, No. 3, pp. 52-59, May 1-Jun. 2021, doi: 10.1109/MIC.2020.3024605. (Year: 2021).*

*Primary Examiner* — Hanh Thi-Minh Bui
(74) *Attorney, Agent, or Firm* — Finnegan, Henderson, Farabow, Garrett & Dunner LLP

(57) ABSTRACT

Disclosed herein are methods, systems, and computer-readable media for integrating a particular external application programming interface (API) with a natural language model user interface. In one embodiment, a method includes receiving a first input at the natural language model user interface, determining the first input includes a request to integrate the particular external application programming interface (API) with the natural language model user interface, identifying the particular external API based on the received input, integrating the particular external API with the natural language model user interface, accessing the particular external API based on the first input or a second input at the natural language model user interface, and transmitting, based on the accessing, a response message to the natural language model user interface, the response message including a result of the accessing.

12 Claims, 5 Drawing Sheets

(56) References Cited

U.S. PATENT DOCUMENTS

| | | | |
|---|---|---|---|
| 11,461,311 B2 | 10/2022 | Rodrigues | |
| 2019/0132264 A1* | 5/2019 | Jafar Ali | G06F 40/295 |
| 2020/0285528 A1* | 9/2020 | Olsen | G06F 40/205 |
| 2021/0042094 A1* | 2/2021 | Burman | G06F 9/44521 |
| 2022/0004702 A1 | 1/2022 | Liang et al. | |

FOREIGN PATENT DOCUMENTS

| | | |
|---|---|---|
| EP | 3 545 427 B1 | 11/2017 |
| EP | 3 599 555 A1 | 5/2019 |
| EP | 4 060 517 A1 | 3/2021 |

* cited by examiner

SCHEMA-BASED INTEGRATION OF EXTERNAL APIs WITH NATURAL LANGUAGE APPLICATIONS

FIELD OF DISCLOSURE

The disclosed embodiments generally relate to systems, devices, methods, and computer readable media for integrating external application programming interfaces (APIs) with a natural language model.

BACKGROUND

Extant natural language models, while useful for certain functions, are limited in many ways. For example, extant natural language models have access only to information from training data provided to the natural language model. As another example, training natural language models is expensive and coupled with the fact that training data is often out-of-date and/or must be tailored specifically to one of many potential applications, the cost of training continues to rise while the benefits of the training remain limited. Furthermore, with regard to external data and applications, extant natural language models typically can only perform limited, if any, operations relating to the external data or applications.

The inventors here have recognized several technical problems with such conventional systems not limited to those exemplified above. The present disclosure addresses the technical problems with extant natural language models and provides solutions for improving the trainability, scalability, and generation of natural language models with respect to external data and applications.

SUMMARY

Embodiments of the present disclosure present technological improvements as solutions to one or more of the above-mentioned technical problems recognized by the inventors in conventional systems.

For example, embodiments of the present disclosure may include a computer-implemented method for integrating a particular external application programming interface (API) with a natural language model user interface, including receiving a first input at the natural language model user interface. Embodiments may also include determining the first input includes a request to integrate the particular external application programming interface (API) with the natural language model user interface.

Embodiments may also include identifying the particular external API based on the received input. Embodiments may also include integrating the particular external API with the natural language model user interface. Embodiments may also include accessing the particular external API based on the first input or a second input at the natural language model user interface. Embodiments may also include transmitting, based on the accessing, a response message to the natural language model user interface, the response message including a result of the accessing.

In some embodiments, the natural language model user interface may be communicably connected to a natural language model configured to recognize and interpret user messages and API payloads. In some embodiments, the particular external API may be a third-party software API that provides access to data or functionality not natively available within a system associated with the natural language model user interface.

Embodiments may also include integrating the particular external API with the natural language model user interface, wherein the integrating may include accessing a manifest stored in a location associated with the third-party software API. In some embodiments, the manifest may be customizable by a publisher of the third-party software API. Embodiments may also include integrating the particular external API with the natural language model user interface, wherein the integrating may further include accessing a web API and a description of the web API.

Embodiments may also include determining a location of the description of the web API which may be provided in the manifest. In some embodiments, the description of the web API may be hosted by a publisher of the third-party software API. In some embodiments, the description of the web API may include descriptions for different users. In some embodiments, the natural language model user interface may be communicably connected to a natural language model that may be trained to call one or more functions based on the manifest and in response to the received input.

In some embodiments, the one or more functions may be translated into one or more requests to be executed by at least one processor associated with the natural language model user interface. Embodiments may also include transmitting the response message to the user, wherein the transmitting may include summarizing payload contents received from the particular external API and displaying natural language text to the user via the natural language model user interface.

In some embodiments, the method may include receiving a third input at the natural language model user interface. Embodiments may also include determining the third input includes a request to integrate a second particular external application programming interface (API) with the natural language model user interface. Embodiments may also include identifying the second particular external API based on the received third input.

Embodiments may also include integrating the second particular external API with the natural language model user interface. Embodiments may also include accessing the second particular external API based on the third input or a fourth input at the natural language model user interface. Embodiments may also include transmitting, based on the accessing of the second particular external API, a response message to the natural language model user interface, the response message including a result of the accessing of the second particular external API.

Embodiments of the present disclosure may also include a system including at least one memory storing instructions. Embodiments may also include at least one processor configured to execute the instructions to perform operations for integrating a particular external application programming interface (API) into a natural language model user interface, the operations including receiving a first input at the natural language model user interface, determining that the first input includes a request to integrate a particular external application programming interface (API) with the natural language model user interface, identifying the particular external API based on the received input, integrating the particular external API with the natural language model user interface, accessing the particular external API based on the first input or a second input at the natural language model user interface, and transmitting, based on the accessing, a response message to the natural language model user interface, the response message including a result of the accessing.

In some embodiments, the natural language model user interface may be communicably connected to a natural language model configured to recognize and interpret user messages and API payloads. In some embodiments, the particular external API may be a third-party software API that provides access to data or functionality not natively available within a system associated with the natural language model user interface.

Embodiments may also include integrating the particular external API with the natural language model user interface, wherein the integrating may include accessing a manifest stored in a location associated with the third-party software API. In some embodiments, the manifest may be customizable by a publisher of the third-party software API. Embodiments may also include integrating the particular external API with the natural language model user interface, wherein the integrating may further include accessing a web API and a description of the web API.

Embodiments of the present disclosure may also include a non-transitory computer-readable medium including instructions that may be executable by one or more processors to perform operations including receiving a first input at the natural language model user interface, determining the first input includes a request to integrate a particular external application programming interface (API) with the natural language model user interface, identifying the particular external API based on the received input, integrating the particular external API with the natural language model user interface, accessing the particular external API based on the first input or a second input at the natural language model user interface, and transmitting, based on the accessing, a response message to the natural language model user interface, the response message including a result of the accessing.

Other systems, methods, and computer-readable media are also discussed within.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
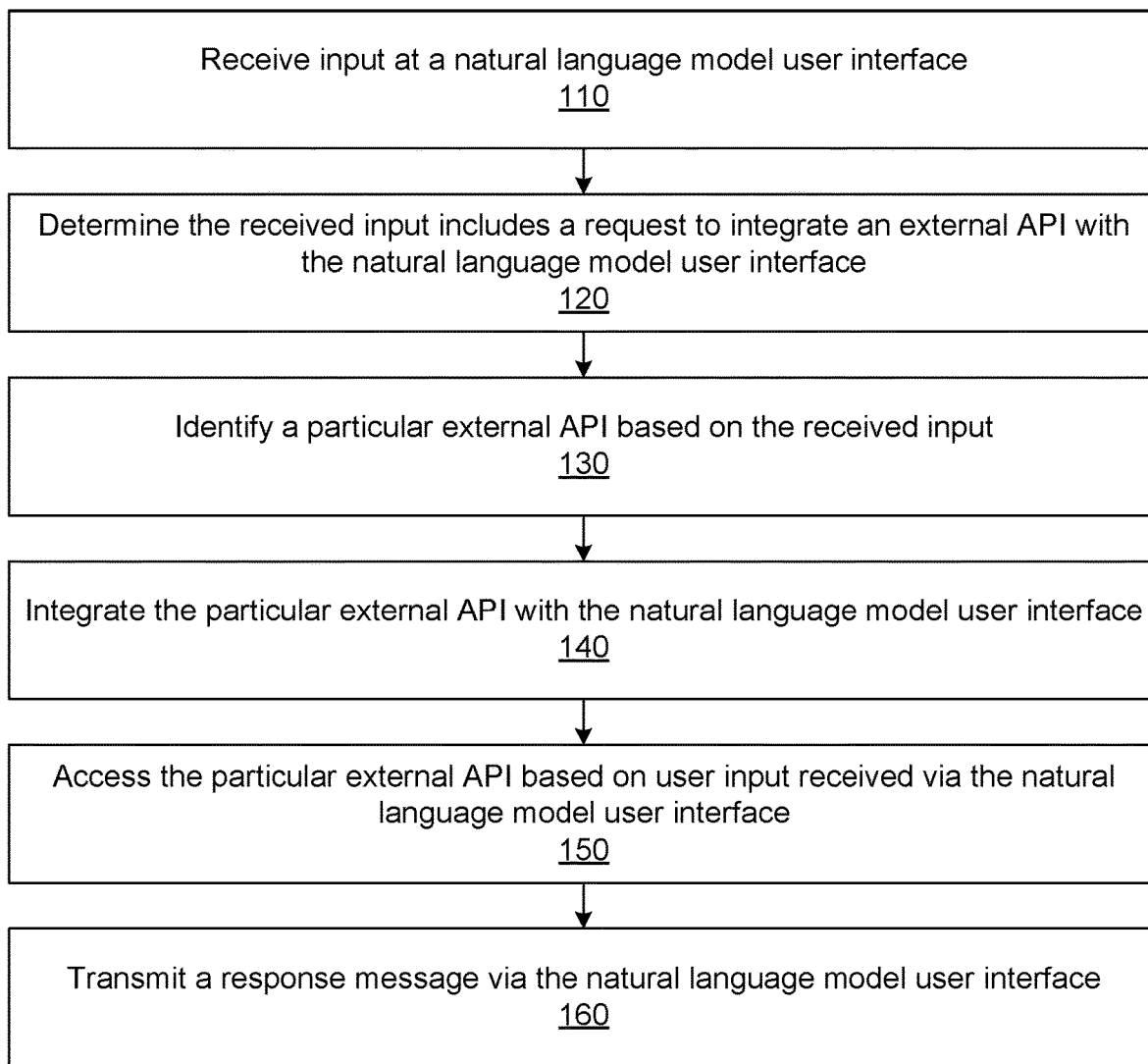
FIG. 1 illustrates an exemplary method for integrating a particular external API with a natural language model user interface according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

Augmenting natural language models so that they can interact both automatically, accurately, and safely with external tools and applications based solely on a user input solves the problems described above and enables the production of further sophisticated natural language models and associated systems. The solutions described herein enable natural language models to receive and readily use, in addition to any training data, information that is most recent and most specific as provided by a publisher of an external tool or application. Via documentation which can be published by such publishers, and in combination with standard documentation available online, natural language models may be enabled to harvest data (e.g., available online) to understand the functions available to them in interacting with an API associated with the external tool or application. In turn, the natural language model may take both safe, valid, and constrained actions with respect to a tool or application external to the model on behalf of a user interacting with the natural language model. Furthermore, the model may then provide a resulting output from the external tool or application to the user, all without the user needing to access the external tool or application on their own. Moreover, all of this may be performed without any involvement from users, developers, or administrators associated with the natural language model or associated systems. This also allows managers of the tool or application to change it without any using of the model or any interaction with the model, and with the model still being able to use the tool or application without requiring reconfiguration.

Connecting natural language models to external tools and applications introduces new opportunities including increasing the safety of natural language models and systems associated therewith, allowing users to interact with various external tools and applications via a single natural language model user interface, verifying sources and information that the natural language model draws upon, reducing inaccuracies resulting from multiple user interfaces and/or API access points, and improving interoperability between natural language models and other applications.

As an example, if a publisher of an external tool or application desires to allow that external tool or application to be accessible by (and thus integratable with) a natural language model via an API associated with the external tool or application, the publisher may follow one or more of the following steps (without requiring any additional interaction or involvement of any user associated with the natural language model):

1. Create an API with endpoints configured to be called by a natural language model or an associated system (e.g., an existing developer API or a wrapper around an existing API).

2. Write a description specification documenting the created API and a manifest file that includes the location of the description specification and additional metadata usable for training the natural language model (e.g., explanations of call functions available with the tool or application).

3. Given the API documentation (e.g., the manifest file and the description specification) and the context of a conversation with a user via a user interface of the natural language model, the natural language model(s) and associated system(s) may be configured to automatically determine the parameters needed to invoke the publisher-created API in order to fulfill a user intent or request.

Some non-limiting practical application examples of the disclosure are provided below.

In some embodiments, in response to a conversation with a user, a natural language model and/or associated system may generate digital information and access a particular external API. For example, a natural language model and/or associated system may generate a shopping list and access a particular external API in order to generate an online shopping cart including items from the shopping list, edit the online shopping cart, and place an order for the user, via an external application as chosen by the user. As another example, in some embodiments, in response to a conversation with a user (e.g., including through interpreting digital natural language input), a natural language model and/or associated system may, based on instructions received from the user, access an external application containing a database of curated data and computation capabilities, deliver accurate and up-to-the-minute answers for a wide range of questions, and thereby enhance conversational workflows. As yet a further example, in some embodiments, in response to a conversation with a user (e.g., including through interpreting digital natural language input), a natural language model and/or associated system may, based on instructions received from the user, automate tasks for the user across one or more external applications (e.g., replying to emails, locating data in a file or a database, or editing documents, all without the user needing to access one or more external APIs associated with the one or more external applications.

Illustrative embodiments of the present disclosure are described below.

FIG. 1 is a flowchart that describes a computer-implemented method 100 for integrating a particular external application programming interface, according to some embodiments of the present disclosure. The process shown in FIG. 1 or any of its constituent steps may be implemented using operating environment 400, system 500, or any component thereof. The steps illustrated in FIG. 1 are exemplary and steps may be added, merged, divided, duplicated, repeated (e.g., as part of a machine learning process), modified, performed sequentially, performed in parallel, and/or deleted in some embodiments.

In some embodiments, at 110, the computer-implemented method may include receiving a first input at the natural language model user interface. For example, a first input may be a user input (e.g., input at an input/output device 418). A user input may include, e.g., at least one of a natural language input, an indication of a desired external API for integration, or a selection of a desired external API for integration. For example, a user may enter text (e.g., into a chat window also configured to display natural language model output or into a search bar), a selection of a user interface element (e.g., from within a drop-down menu), perform a click-and-drag operation, or perform any other action with an input device that provides a natural language input and/or indication of a particular external API. In some embodiments, a plugin causing the natural language model to be communicably coupled to a particular external API may be enabled (e.g., in response to a user input at the natural language model user interface). Enabling the plugin may initiate a plugin service that allows the natural language model user interface (or an associated program) to electronically communicate with a particular external API. In some embodiments, the natural language model user interface may be operated from within a web client (e.g., a web client communicably and electronically connected to the natural language model). In some embodiments, the same web client (or a different web client) may be used to transmit and receive digital information to or from a particular external API, consistent with disclosed embodiments.

In some embodiments, the natural language model user interface may be communicably connected to a natural language model configured to recognize and interpret user input (e.g., natural language messages) and external API payloads. For example, the natural language model may be trained (e.g., using input data reflecting user input and/or external API payloads, using feedback or validation data associated with correct results) to understand a request implicit or explicit in natural language input and an associated function or other tool associated with responding to the request. In some embodiments, the natural language model may be associated with a chatbot (e.g., the natural language model user interface may include a chatbot). In some embodiments, the particular external API may be a third-party software API that provides access to data or functionality not natively available within a system associated with (e.g., hosting) the natural language model user interface and/or the natural language model user interface.

Referring further to FIG. 1, at 120, exemplary embodiments of the computer-implemented method 100 may include determining that the first input includes a request to integrate the particular external application programming interface (API) with the natural language model user interface. For example, the first input may include a natural language input indicating a particular external API or service (e.g., a name of an API or service or digital marker identifying a particular external API or service). As another example, the first input may include a non-natural language input indicating a particular external API or service (e.g., a selection of an API or service identifier from a menu or search bar, an input of a Uniform Resource Locator, or URL, an input of a Uniform Resource Identifier, or URI).

In some embodiments, and referring further to FIG. 1, at 130, the computer-implemented method 100 may include identifying the particular external API based on the received input. For example, if the first input is a natural language input, identifying the particular external API may include parsing the natural language input to determine a desired external API (e.g., by detecting a keyword associated with the desired external API). As another example, if the first input is a selection, identifying the particular external API is determined directly based on the selection.

In some embodiments, and referring further to FIG. 1, at 140, the computer-implemented method 100 may include integrating the particular external API with the natural language model user interface. In some embodiments, integrating the particular external API with the natural language model user interface may include accessing a manifest stored in a location associated with the third-party software API. Integrating the particular external API with the natural language model user interface may include, e.g., accessing, via a system associated with the natural language model user interface, a manifest provided by a publisher associated with the particular external API. The manifest may describe AI- or model-specific properties related to the corresponding external API. In some embodiments, a manifest may be hosted and stored (i.e., located) in a location associated with the particular external API (e.g., a website, domain, or application associated with the particular external API). A host (e.g., server, storage device) of the manifest may be distinct from (e.g., remote from and/or uncontrolled by) a host of the natural language model and/or natural language model user interface. In some embodiments, the manifest may be accessed using a known URL.

In some embodiments, the manifest may be customizable by a publisher (e.g., management device or system) of the third-party software API. In some embodiments, a manifest may be editable (i.e., customizable) by a publisher associated with a particular external API or service. In some embodiments, the manifest may not be editable by a system or user associated with (e.g., hosting or running) the natural language model user interface and/or the natural language model. In some embodiments, integrating the particular external API with the natural language model user interface may further include accessing a web API and/or a description of the web API. In further embodiments, integrating the particular external API with the natural language model user interface may include accessing a web API. A web API may be, e.g., a Hypertext Transfer Protocol (HTTP) API, a Python API, or a REST (representation state transfer) API. In yet further embodiments, integrating the particular external API with the natural language model user interface may include accessing a description of the web API. Such a description of the web API may be formatted according to, e.g., an OpenAPI or any open standard for describing a web API. In some embodiments, the location of the web API, the location of the description of the web API, or both locations may be indicated in a corresponding manifest. In some embodiments, a manifest, a corresponding web API, and a corresponding description of the web API may all be hosted by a publisher of the particular external API.

In some embodiments, a location of the description of the web API may be provided in the manifest. In some embodiments, the description of the web API may be hosted by a publisher of the third-party software API. In some embodiments, the description of the web API may include descriptions for different users. In some embodiments, the natural language model user interface may be communicably connected to a natural language model. In some embodiments, the natural language model user interface may be trained to call one or more functions (e.g., based on the manifest and/or in response to the received input).

For example, if a particular external API is hosted at the domain, "example.com," the manifest associated with the particular external API may be located at the URL, "example.com/well-known/ai-plugin.json," and the OpenAPI spec would be located at the URL, "example.com/openapi.json," as indicated in the manifest. In turn, a natural language model may access (e.g., scrape) the manifest and a description corresponding to a particular external API, as provided by a publisher of the particular external API, and utilize these documents to inform (e.g., through a training process) the natural language model as to call functions available to the natural language model when interacting with the particular external API, and how to use those call functions to achieve particular results (e.g., results responsive to a natural language input). Training of the natural language model may be supervised or unsupervised, consistent with disclosed embodiments. In some embodiments, training of the natural language model may be supervised or influenced by an entity (e.g., publisher, manager, or host device) associated with the particular external API. Furthermore, a system associated with the natural language model may then convert the call functions generated by the natural language model into actions to be taken over a communication protocol (e.g., HTTP), thereby generating requests to the particular external API. As a result, a publisher of a particular external API wishing to interface the particular external API with a natural language model may share a web domain where a corresponding manifest is hosted. In some embodiments, the publisher may share the domain name because the manifest may be located in a known location within that domain. In turn, a natural language model receiving the domain name, either directly from a publisher or via its user interface from a user, may facilitate interactions between a user of the natural language model and the particular external API. Thus, by providing the training data and descriptive information via a shareable manifest, disclosed embodiments significantly reduces the additional work that publishers of external APIs must do to support integrations of the particular external API across any number of natural language models. This also reduces demand on computing resources. Similarly, disclosed embodiments also allow for a single natural language model to access and utilize any number of different and separately managed external APIs. Moreover, disclosed embodiments allow for the updating of an integrated external API when the shareable manifest is edited and the particular external API is redeployed, because the natural language model may be configured to periodically access and scrape the manifest and the corresponding description of a web API thereby receiving any updates made by a publisher of the particular external API.

In some embodiments, and referring further to FIG. 1, at 150, the computer-implemented method 100 may include accessing the particular external API based on the first input or a second input at the natural language model user interface. In some embodiments, the first input may be a selection indicating a desired external API and the second input may be a natural language input, which may indicate a desired result by a user of the natural language model. In some embodiments, the first input may be a natural language input indicating both a desired external API and a desired result by a user of the natural language model. Accessing the particular external API may include requesting access to the particular external API, electronically communicating with the particular external API, generating digital information to transmit to the particular external API, translating digital information to transmit to the particular external API, transmitting data to the particular external API, and/or receiving digital information (e.g., a result) from the particular external API. In some embodiments, the natural language model may be configured to generate a function call to receive digital information, which may be used by the model to generate an output, consistent with disclosed embodiments. In some embodiments, the function call generated by the natural language model may be converted (e.g., by the natural language model or a program, application, script, or module) into an API call, which may be configured to be interpretable by the particular external API.

In some embodiments, the natural language model user interface may receive authentication parameter input (e.g., a third input, such as a username and password), which may enable the natural language model user interface to access particular digital information associated with the particular external API and/or user (e.g., personal user data). In some embodiments, the natural language model user interface may determine that a selected external API requires authentication to perform one or more operations and/or may prompt a user device for authentication parameter input (e.g., at the natural language model user interface).

According to some embodiments, a natural language model may be trained to call functions in response to the first or second input. For example, a natural language model may be provided, in the model's system prompt, with a description of functions specific to one or more particular APIs via the manifest. From the description of functions, the natural language model may select one or more of the functions which it may determine based on the desired external API, a natural language input from a user of the natural language model user interface, and information scraped from the manifest and/or the description of the particular web API (e.g., according to associations learned through training). Therefore, accessing the particular external API may include generating one or more call functions based on the first and/or second input. In turn, the one or more call functions may be translated into one or more actions or web requests (e.g., one or more HTTP requests) which may be executable by a system (e.g., at least one processor) associated with the natural language model. In some embodiments, the one or more functions may be translated into one or more requests to be executed by at least one processor associated with the natural language model user interface.

In some embodiments, and referring further to FIG. 1, at 160, the computer-implemented method 100 may include transmitting, based on the accessing, a response message (e.g., based on a result from the particular external API) to the natural language model user interface. In some embodiments, the response message may include a result of (e.g., based on) the accessing of the particular external API. In some embodiments, transmitting the response message to the user may include summarizing payload contents received from the particular external API and generating (e.g., using the natural language model) and displaying natural language text (e.g., based on the payload contents) to the user via the natural language model user interface.

Figure 2:
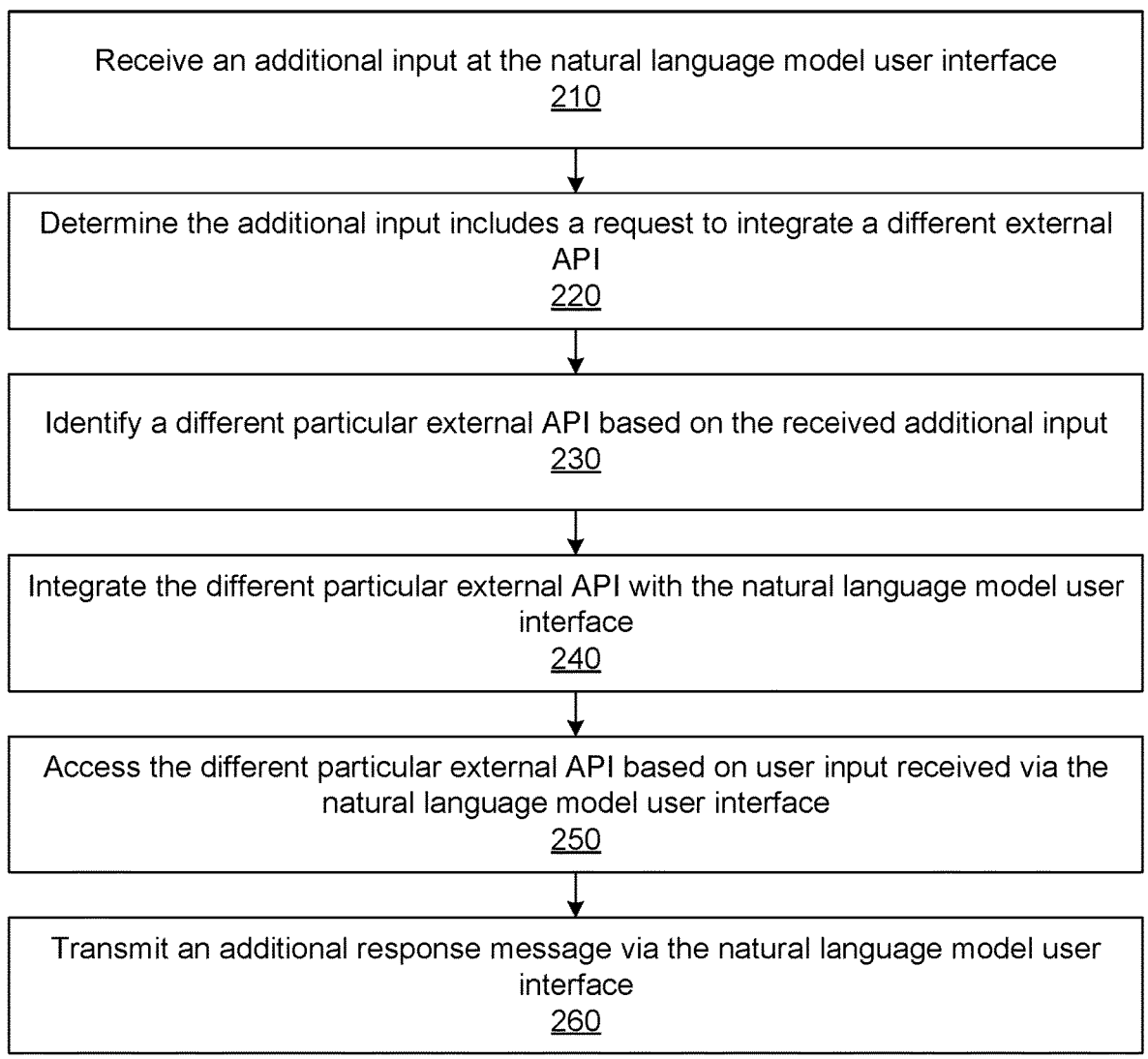
FIG. 2 illustrates another exemplary method for integrating a particular external API with a natural language model user interface according to some embodiments of the present disclosure.

For example, a result of the accessing of the particular external API may include receiving an output from the particular external API via a web API endpoint. The output may be, e.g., a payload or other machine-readable data provided by an external application via the particular external API. The payload may be, e.g., a JavaScript Object Notation (JSON), YAML, or other markup language payload. In some embodiments, the machine-readable data may include rich text or image data, streaming data, user interface affordance data (e.g., buttons), and machine-learned data. In some embodiments, the machine-readable data may be provided to the natural language model, and in turn, the natural language model may translate and summarize the contents of the machine-readable data to a user via the natural language model user interface (e.g., by outputting natural language text generated by the model). As another example, a result of the accessing of the particular external API may further include the execution of a function within an external application, and thereafter receiving an output from the particular external API indicating that the function was successfully executed. In some embodiments, output based on the particular external API may be provided within the natural language model (e.g., a module communicably linked to the particular external API, a generated URL configured to access the particular external API, rich text and/or images, streaming data, special user interface graphics such as buttons, etc.). Similarly, while the natural language model may receive machine-readable data from the particular external API, e.g., as a payload, the natural language model may, in turn, translate and summarize that data and provide to a user, via the natural language model user interface, a natural language response based on the received output. In some embodiments, FIG. 2 is a flowchart that further describes an exemplary computer-implemented method 200 for integrating a different external application programming interface (e.g., from FIG. 1), according to some embodiments of the present disclosure. The process shown in FIG. 2 or any of its constituent steps may be implemented using operating environment 400, system 500, or any component thereof. The steps illustrated in FIG. 2 are exemplary and steps may be added, merged, divided, duplicated, repeated (e.g., as part of a machine learning process), modified, performed sequentially, performed in parallel, and/or deleted in some embodiments.

In some embodiments, at 210, the method 200 may include receiving an additional input (e.g., a third input) at the natural language model user interface. At 220, the method 200 may include determining the additional input includes a request to integrate a different external application programming interface (API), e.g., a second API, with the natural language model user interface. At 230, the method 200 may include identifying a different particular external API (e.g., a second particular external API) based on the received additional input.

In some embodiments, and further referring to FIG. 2, at 240, the method 200 may include integrating the different particular external API with the natural language model and the natural language model user interface. At 250, the method 200 may include accessing the different particular external API based on the additional input or a further input (e.g., a fourth input) at the natural language model user interface. At 260, the method 200 may include transmitting, based on the accessing of the different particular external API, an additional response message via the natural language model user interface, the response message including a result of the accessing of the different particular external API. As a result, a user of the natural language model may request, via natural language input, actions to be performed at various external APIs (e.g., at least two different external APIs) using the same natural language model user interface.

Figure 3:
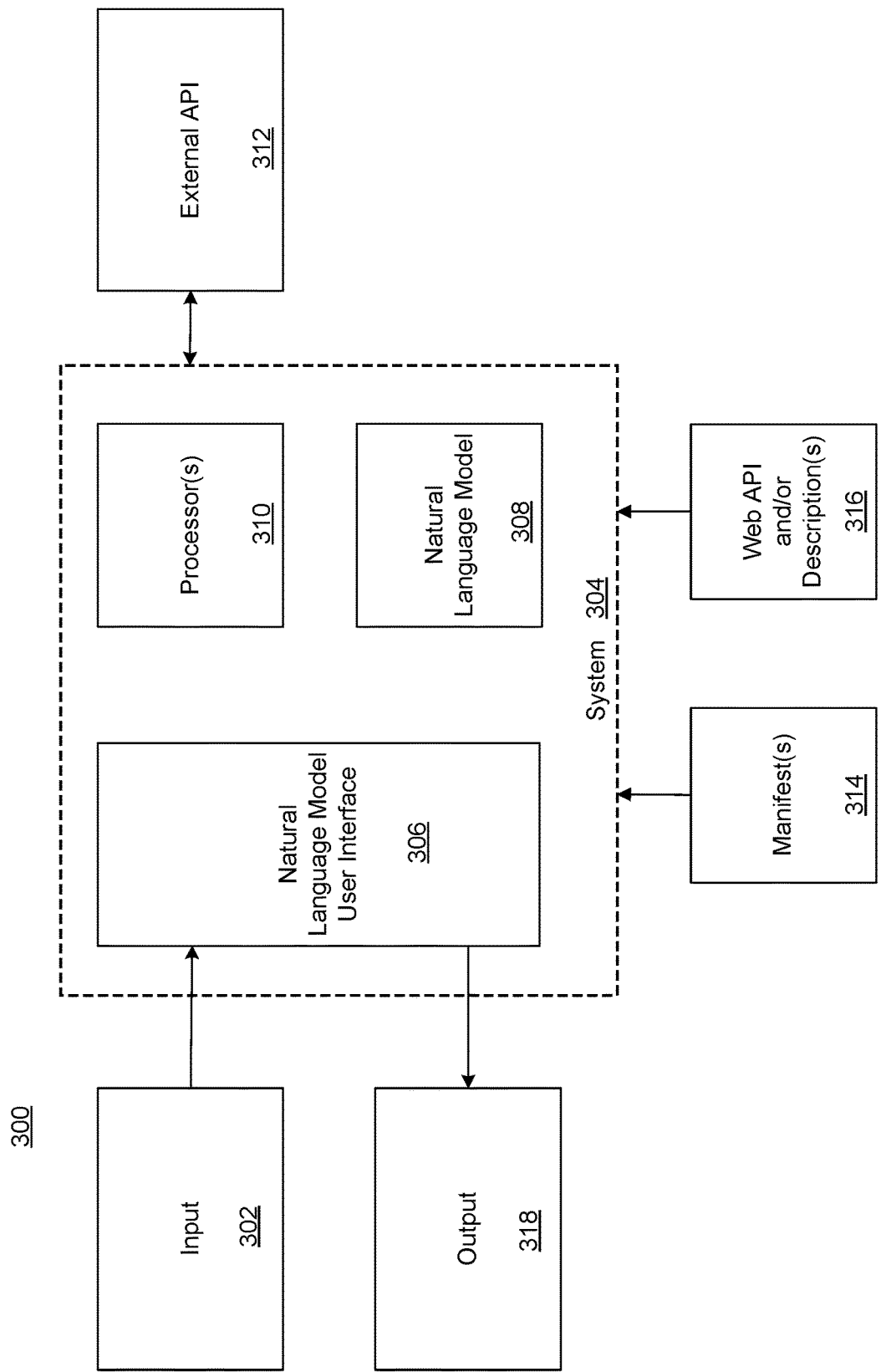
FIG. 3 is a functional block diagram according to some embodiments of the present disclosure.

FIG. 3 is a block diagram that describes an exemplary operating environment 300 for implementing the method of FIGS. 1 and 2 and for integrating one or more external APIs with a natural language model, according to some embodiments of the present disclosure. In some embodiments, the operating environment 300 may include a system 304 comprising at least one memory storing instructions (not shown), at least one processor 310 configured to execute the instructions to perform a set of operations for integrating a particular external application programming interface (API) 312 into a natural language model user interface 306. The set of operations may mirror the steps of the method 100 described herein. As such, the system 304 may be configured for receiving a first input at the natural language model user interface. In some embodiments, system 304 may be a single device (e.g., computer device 402) or multiple devices. The system 304 may further be configured for determining the first input includes a request to integrate the particular external application programming interface (API) with the natural language model user interface. The system 304 may also be configured for identifying the particular external API based on the received input. Further, the system 304 may be configured for integrating the particular external API with the natural language model user interface. The system 304 may also be configured for accessing the particular external API based on the first input or a second input at the natural language model user interface. The system 304 may further be configured for transmitting, based on the accessing, a response message to the natural language model user interface, the response message including a result of the accessing.

In some embodiments, and further referring to FIG. 3, the operating environment 300 may include an input 302 which is received at a natural language model user interface 306 of system 304, wherein the input 302 includes a request to integrate a particular external application programming interface (API) with a natural language model 308 and/or with the natural language model user interface 306. In some embodiments, the natural language model 308 may determine that the input (e.g., a first input) includes such a request to integrate the particular external API. In some embodiments, the natural language model may identify the particular external API 312 which a user desires to integrate with the natural language model 308 and/or natural language model user interface 306 based on the received input 302. In some embodiments, system 304 may integrating the particular external API 312 with the natural language model 308 and/or the natural language model user interface 306. In some embodiments, the natural language model 308 and/or system 304 may identify and access information within one or more manifests 314 indicated by the input 302 and/or the identified particular external API 312. In some embodiments, the natural language model 308 and/or system 304 may identify one or more web APIs and/or descriptions of the web API(s) 316 and access information within the one or more descriptions of the web API(s). In some embodiments, the system 304 may access the particular external API 312 based on the input 302 (e.g., the initial input received or a second input received) at the natural language model user interface 306. As an example, one or more processors 310 may receive a call function generated by the natural language model, based on the information provided in manifest(s) 314 and/or description(s) 316, and translate that call function to a web request, via processor(s) 310, to be transmitted by system 304 to the particular external API 312. In turn, the particular external API 312 may cause a functionality in an application associated with the particular external API 312 and/or transmit a response to the web request back to system 304. In some embodiments, the system 304 may transmit, based on the accessing, an output 318 (e.g., a response message) via the natural language model 308 and/or the natural language model user interface 306. For example, the response message may include a result of the accessing of the particular external API.

According to another embodiment of the present disclosure, a non-transitory computer readable medium comprising instructions to perform steps for integrating a particular external API with a natural language model and/or natural language model user interface may be provided. The steps embodied in the instructions of the non-transitory computer readable medium may mirror the steps of the method 100 described herein. As such, the steps may be configured for receiving a first input at the natural language model user interface. The steps may further be configured for determining the first input includes a request to integrate the particular external application programming interface (API) with the natural language model user interface. The steps may also be configured for identifying the particular external API based on the received input. Further, the steps may be configured for integrating the particular external API with the natural language model user interface. The steps may also be configured for accessing the particular external API based on the first input or a second input at the natural language model user interface. The steps may further be configured for transmitting, based on the accessing, a response message to the natural language model user interface, the response message including a result of the accessing.

Figure 4:
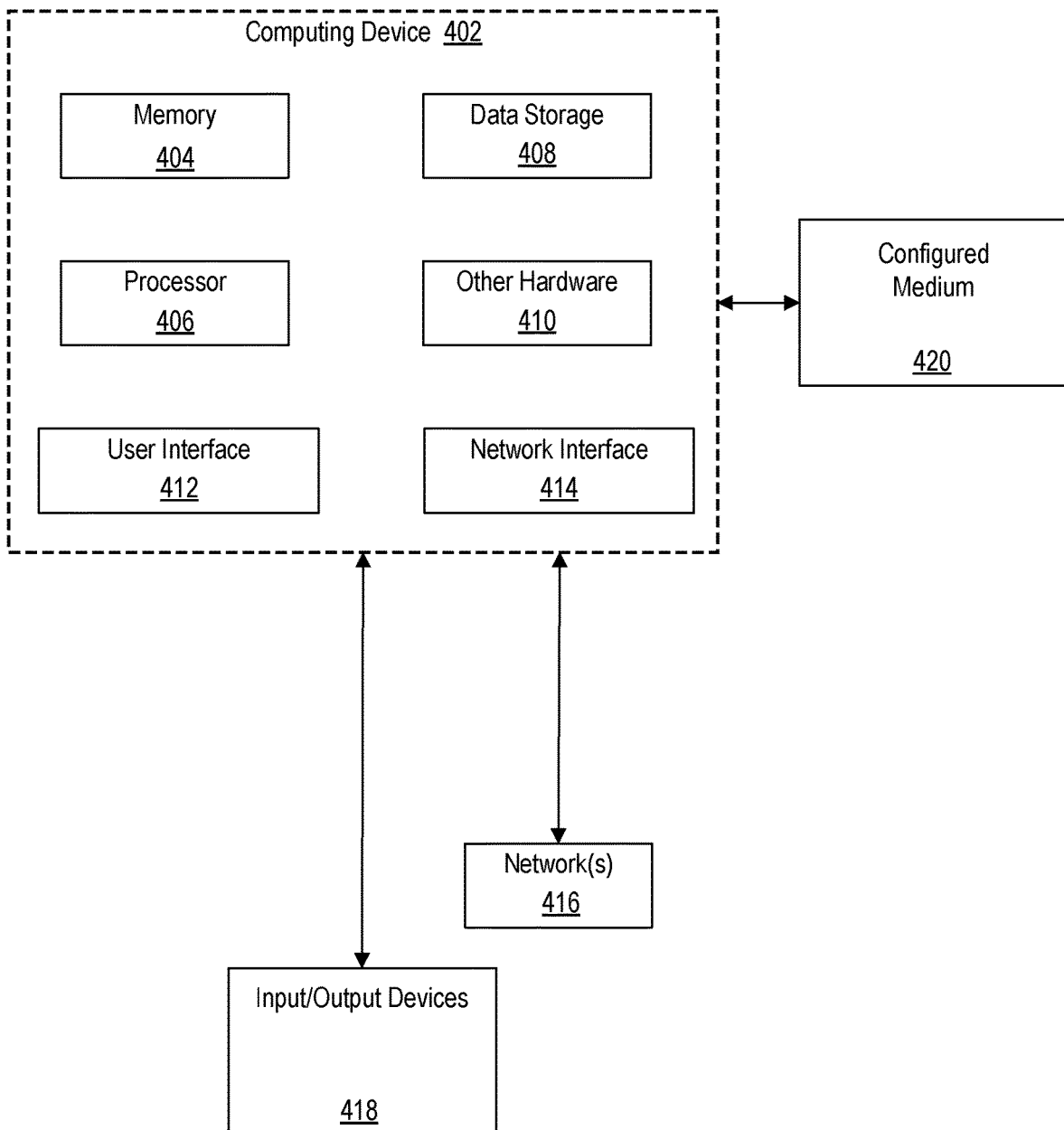
FIG. 4 is a block diagram illustrating an exemplary operating environment for implementing various aspects of this disclosure, according to some embodiments of the present disclosure.

An exemplary operating environment for implementing various aspects of this disclosure is illustrated in FIG. 4. As illustrated in FIG. 4, an exemplary operating environment 400 may include a computing device 402 (e.g., a general-purpose computing device) in the form of a computer. In some embodiments, computing device 402 may be associated with a user. Components of the computing device 402 may include, but are not limited to, various hardware components, such as one or more processors 406, data storage 408, a system memory 404, other hardware 410, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 4, an operating environment 400 for an exemplary embodiment includes at least one computing device 402. The computing device 402 may be a uniprocessor or multiprocessor computing device. An operating environment 400 may include one or more computing devices (e.g., multiple computing devices 402) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 402 may be configured for end-users, e.g., with applications, for administrators, as a server, as a distributed processing node, as a special-purpose processing device, or otherwise configured to train machine learning models and/or use machine learning models. In some embodiments, multiple computing devices 402 (e.g., a network of GPUs) may be configured to train a machine learning model.

One or more users may interact with the computer system comprising one or more computing devices 402 by using a display, keyboard, mouse, microphone, touchpad, camera, sensor (e.g., touch sensor) and other input/output devices 418, via typed text, touch, voice, movement, computer vision, gestures, and/or other forms of input/output. An input/output device 418 may be removable (e.g., a connectable mouse or keyboard) or may be an integral part of the computing device 402 (e.g., a touchscreen, a built-in microphone). A user interface 412 may support interaction between an embodiment and one or more users. A user interface 412 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touchscreen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 418 and computing device 402, based on input received from at user interface 412 and/or from network(s) 416. As used throughout, "based on" may refer to being established or founded upon a use of, changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 402 in other embodiments, depending on their detachability from the processor(s) 406. Other computerized devices and/or systems not shown in FIG. 4 may interact in technological ways with computing device 402 or with another system using one or more connections to a network 416 via a network interface 414, which may include network interface equipment, such as a physical network interface controller (NIC) or a virtual network interface (VIF).

Computing device 402 includes at least one logical processor 06. The at least one logical processor 406 may include circuitry and transistors configured to execute instructions from memory (e.g., memory 404). For example, the at least one logical processor 406 may include one or more central processing units (CPUs), arithmetic logic units (ALUs), Floating Point Units (FPUs), and/or Graphics Processing Units (GPUs). The computing device 402, like other suitable devices, also includes one or more computer-readable storage media, which may include, but are not limited to, memory 404 and data storage 408. In some embodiments, memory 404 and data storage 408 may be part of a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 420 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 402, making its content accessible for interaction with and use by processor(s) 406. The removable configured medium 420 is an example of a computer-readable storage medium. Some other examples of computer-readable storage media include built in random access memory (RAM), read-only memory (ROM), hard disks, and other memory storage devices which are not readily removable by users (e.g., memory 404).

The configured medium 420 may be configured with instructions (e.g., binary instructions) that are executable by a processor 406; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 420 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 410 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 406, memory 404, data storage 408, and screens/displays, an operating environment 400 may also include other hardware 410, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 418 such as human user input/output devices (screen, keyboard, mouse, tablet, microphone, speaker, motion sensor, etc.) will be present in operable communication with one or more processors 406 and memory.

In some embodiments, the system includes multiple computing devices 402 connected by network(s) 416. Networking interface equipment can provide access to network(s) 416, using components (which may be part of a network interface 414) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 402 may operate in a networked or cloud-computing environment using logical connections to one or more remote devices (e.g., using network(s) 416), such as a remote computer (e.g., another computing device 402). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 402 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 402 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 408 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 408 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 4, an operating environment 400 may include at least one computing device 402, the at least one computing device 402 including at least one processor 406, at least one memory 404, at least one data storage 408, and/or any other component discussed above with respect to FIG. 4.

Figure 5:
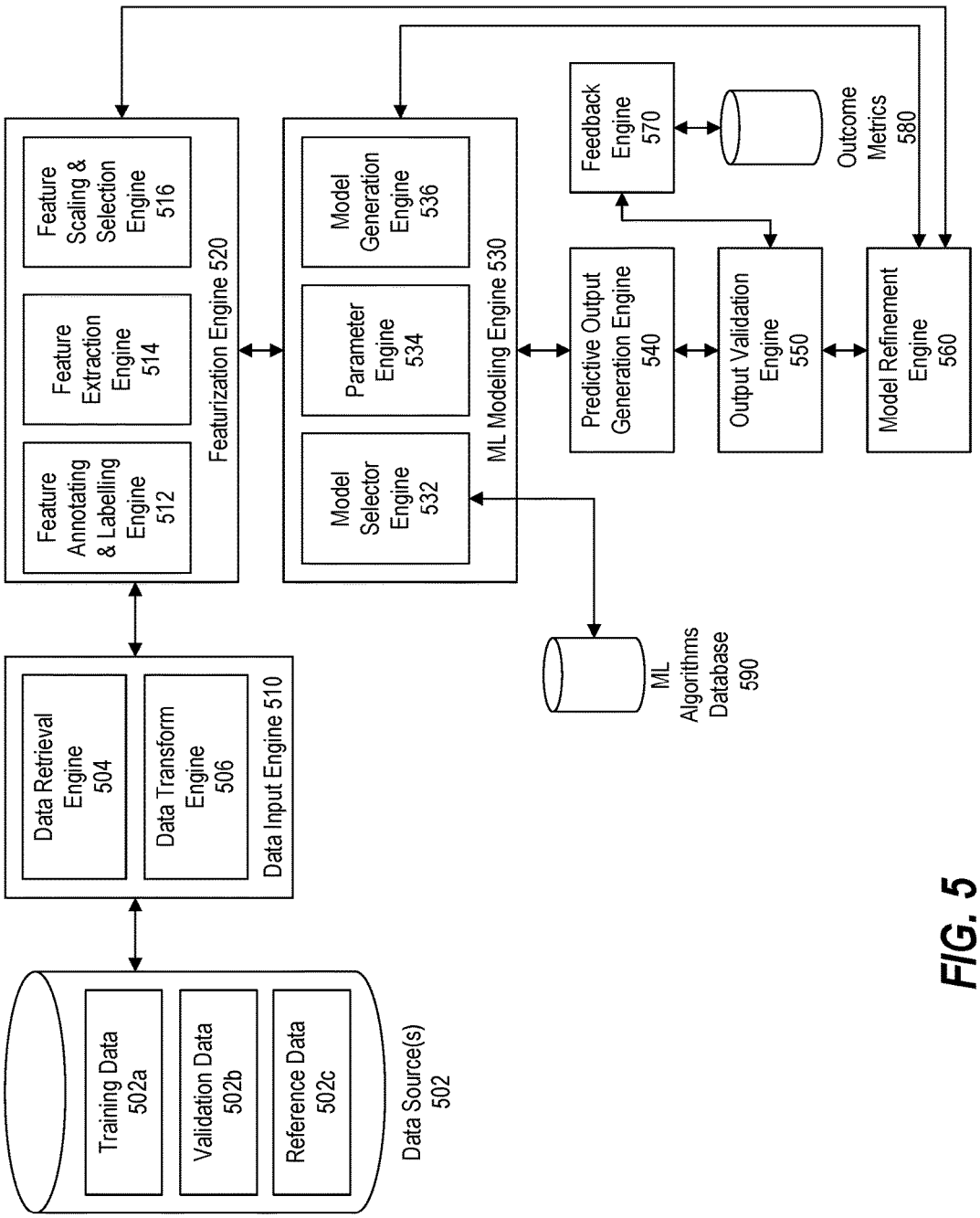
FIG. 5 is a block diagram illustrating an exemplary machine learning platform for implementing various aspects of this disclosure, according to some embodiments of the present disclosure.

FIG. 5 is a block diagram illustrating an exemplary machine learning platform for implementing various aspects of this disclosure, according to some embodiments of the present disclosure.

System 500 may include data input engine 510 that can further include data retrieval engine 504 and data transform engine 506. Data retrieval engine 504 may be configured to access, access, interpret, request, or receive data, which may be adjusted, reformatted, or changed (e.g., to be interpretable by other engine, such as data input engine 510). For example, data retrieval engine 504 may request data from a remote source using an API. Data input engine 510 may be configured to access, interpret, request, format, re-format, or receive input data from data source(s) 502. For example, data input engine 510 may be configured to use data transform engine 506 to execute a re-configuration or other change to data, such as a data dimension reduction. Data source(s) 502 may exist at one or more memories 404 and/or data storages 408. In some embodiments, data source(s) 502 may be associated with a single entity (e.g., organization) or with multiple entities. Data source(s) 502 may include one or more of training data 502a (e.g., input data to feed a machine learning model as part of one or more training processes), validation data 502b (e.g., data against which at least one processor may compare model output with, such as to determine model output quality), and/or reference data 502c. In some embodiments, data input engine 510 can be implemented using at least one computing device (e.g., computing device 402). For example, data from data sources 502 can be obtained through one or more I/O devices and/or network interfaces. Further, the data may be stored (e.g., during execution of one or more operations) in a suitable storage or system memory. Data input engine 510 may also be configured to interact with data storage 508, which may be implemented on a computing device that stores data in storage or system memory. System 500 may include featurization engine 520. Featurization engine 520 may include feature annotating & labeling engine 512 (e.g., configured to annotate or label features from a model or data, which may be extracted by feature extraction engine 514), feature extraction engine 514 (e.g., configured to extract one or more features from a model or data), and/or feature scaling and selection engine 516. Feature scaling and selection engine 516 may be configured to determine, select, limit, constrain, concatenate, or define features (e.g., AI features) for use with AI models. System 500 may also include machine learning (ML) modeling engine 530, which may be configured to execute one or more operations on a machine learning model (e.g., model training, model re-configuration, model validation, model testing), such as those described in the processes described herein. For example ML modeling engine 530 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 502a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 530 may include model selector engine 532 (e.g., configured to select a model from among a plurality of models, such as based on input data), parameter selector engine 534 (e.g., configured to add, remove, and/or change one or more parameters of a model), and/or model generation engine 536 (e.g., configured to generate one or more machine learning models, such as according to model input data, model output data, comparison data, and/or validation data). Similar to data input engine 510, featurization engine 520 can be implemented on a computing device. In some embodiments, model selector engine 532 may be configured to receive input and/or transmit output to ML algorithms database 590 (e.g., a data storage 408). Similarly, featurization engine 520 can utilize storage or system memory for storing data and can utilize one or more I/O devices or network interfaces for transmitting or receiving data. ML algorithms database 590 (or other data storage 508) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 500 can further include predictive output generation engine 540, output validation engine 550 (e.g., configured to apply validation data to machine learning model output), feedback engine 570 (e.g., configured to apply feedback from a user and/or machine to a model), and model refinement engine 560 (e.g., configured to update or re-configure a model). In some embodiments, feedback engine 570 may receive input and/or transmit output (e.g., output from a trained, partially trained, or untrained model) to outcome metrics database 580. Outcome metrics database 580 may be configured to store output from one or more models, and may also be configured to associate output with one or more models. In some embodiments, outcome metrics database 580, or other device (e.g., model refinement engine 560 or feedback engine 570) may be configured to correlate output, detect trends in output data, and/or infer a change to input or model parameters to cause a particular model output or type of model output. In some embodiments, model refinement engine 560 may receive output from predictive output generation engine 540 or output validation engine 550. In some embodiments, model refinement engine 560 may transmit the received output to featurization engine 520 or ML modelling engine 530 in one or more iterative cycles.

Any or each engine of system 500 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 500 may be split across multiple computing devices to allow for distributed processing of the data, which may improve output speed and reduce computational load on individual devices. In some embodiments, system 500 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 500 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments.

In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computer-implemented method for integrating a particular external application programming interface (API) with a natural language model user interface, comprising:
    receiving a first input at the natural language model user interface communicably connected to a natural language model that is trained to call one or more functions based on a manifest and in response to the received first input;
    determining the first input includes a request to integrate the particular external API with the natural language model user interface;
    identifying the particular external API based on the received first input;
    integrating the particular external API with the natural language model user interface, the integrating comprising accessing a web API, a description of the web API, and the manifest stored in a location associated with the particular external API, wherein the manifest is customizable by a publisher of the particular external API;
    accessing the particular external API based on the first input or a second input at the natural language model user interface; and
    transmitting, based on the accessing, a response message to the natural language model user interface, the response message including a result of the accessing, wherein transmitting the response message to the natural language model user interface includes summarizing payload contents received from the particular external API and displaying natural language text to a user via the natural language model user interface.

2. The method of claim 1, wherein the natural language model user interface is communicably connected to a natural language model configured to recognize and interpret user messages and external API payloads.

3. The method of claim 1, wherein the particular external API is a third-party software API that provides access to data or functionality not natively available within a system associated with the natural language model user interface.

4. The method of claim 1, wherein a location of the description of the web API is provided in the manifest.

5. The method of claim 3, wherein the description of the web API is hosted by a publisher of the third-party software API.

6. The method of claim 1, wherein the description of the web API includes descriptions for different users.

7. The method of claim 1, wherein the one or more functions are translated into one or more requests to be executed by at least one processor associated with the natural language model user interface.

8. The method of claim 1, further comprising:
    receiving a third input at the natural language model user interface;
    determining the third input includes an additional request to integrate a second particular external API with the natural language model user interface;
    identifying the second particular external API based on the received third input;
    integrating the second particular external API with the natural language model user interface;
    accessing the second particular external API based on the third input or a fourth input at the natural language model user interface; and
    transmitting, based on the accessing of the second particular external API, an additional response message to the natural language model user interface, the additional response message including a result of the accessing of the second particular external API.

9. A system comprising:
    at least one memory storing instructions;
    at least one processor configured to execute the instructions to perform operations for integrating a particular external application programming interface (API) into a natural language model user interface, the operations comprising:
    receiving a first input at the natural language model user interface communicably connected to a natural language model that is trained to call one or more functions based on a manifest and in response to the received first input;
    determining the first input includes a request to integrate the particular external API with the natural language model user interface;
    identifying the particular external API based on the received first input;
    integrating the particular external API with the natural language model user interface, the integrating comprising accessing a web API, a description of the web API, and the manifest stored in a location associated with the particular external API, wherein the manifest is customizable by a publisher of the particular external API;
    accessing the particular external API based on the first input or a second input at the natural language model user interface; and
    transmitting, based on the accessing, a response message to the natural language model user interface, the response message including a result of the accessing, wherein transmitting the response message to the natural language model user interface includes summarizing payload contents received from the particular external API and displaying natural language text to a user via the natural language model user interface.

10. The system of claim 9, wherein the natural language model user interface is communicably connected to a natural language model configured to recognize and interpret user messages and API payloads.

11. The system of claim 9, wherein the particular external API is a third-party software API that provides access to data or functionality not natively available within a system associated with the natural language model user interface.

12. A non-transitory computer-readable medium including instructions that are executable by one or more processors to perform operations comprising:

receiving a first input at a natural language model user interface communicably connected to a natural language model that is trained to call one or more functions based on a manifest and in response to the received first input;

determining the first input includes a request to integrate a particular external application programming interface (API) with the natural language model user interface;

identifying the particular external API based on the received first input;

integrating the particular external API with the natural language model user interface, the integrating comprising accessing a web API, a description of the web API, and the manifest stored in a location associated with the particular external API, wherein the manifest is customizable by a publisher of the particular external API;

accessing the particular external API based on the first input or a second input at the natural language model user interface; and transmitting, based on the accessing, a response message to the natural language model user interface, the response message including a result of the accessing, wherein transmitting the response message to the natural language model user interface includes summarizing payload contents received from the particular external API and displaying natural language text to a user via the natural language model user interface.

\* \* \* \* \*